United States Patent [19]

Kammori

[11] Patent Number: 5,051,081
[45] Date of Patent: Sep. 24, 1991

[54] APPARATUS FOR PRODUCING SPIRAL PIPES WITH RIB

[75] Inventor: Wakahiko Kammori, Yao, Japan
[73] Assignee: Toyox Co., Ltd., Toyama, Japan
[21] Appl. No.: 487,278
[22] Filed: Mar. 2, 1990

[30] Foreign Application Priority Data

Mar. 3, 1989 [JP] Japan .................................... 1-51309

[51] Int. Cl.⁵ .............................................. B29C 47/24
[52] U.S. Cl. ............................ 425/131.1; 156/244.15; 264/167; 264/209.2; 264/173; 425/381; 425/462; 425/463; 425/467
[58] Field of Search .................. 264/209.2, 173, 209.8, 264/312, 310, 103, 209.1, 167, 503; 425/381, 113, 131.1, 382.3, 133.1, 462–463, 467; 156/143, 149, 244.15

[56] References Cited

U.S. PATENT DOCUMENTS

| 3,289,250 | 12/1966 | Zernay ................................ 425/113 |
| 3,477,891 | 11/1969 | Hawerkamp ...................... 156/143 |
| 3,496,605 | 2/1970 | Onaka ................................ 425/113 |
| 4,548,567 | 10/1985 | Missout ............................. 264/312 |
| 4,826,423 | 5/1989 | Kemp et al. ...................... 264/209.2 |
| 4,830,694 | 5/1989 | Kanao ............................... 156/143 |

FOREIGN PATENT DOCUMENTS

| 56-89531 | 7/1981 | Japan ................................ 264/173 |
| 60-18333 | 1/1985 | Japan ................................ 264/173 |
| 62-104735 | 5/1987 | Japan ................................ 264/173 |
| 62-173237 | 7/1987 | Japan ................................ 264/173 |
| 1349843 | 4/1974 | United Kingdom ............... 264/173 |

Primary Examiner—Jeffery Thurlow
Attorney, Agent, or Firm—Watson, Cole, Grindle & Watson

[57] ABSTRACT

A method for producing a spiral pipe with a rib includes continuously extruding a thermoplastic synthetic resin material in a molten state into a tubular form so as to have a diameter and a predetermined wall thickness of a tubular body to be formed, and winding a rib-portion material in a molten state having a hollow shape or a solid shape in section extruded by an extrusion nozzle rotated about the outer periphery of the extruded and molded tubular body relative to the extrusion speed for the extruded and molded tubular body to integrally form a hollow or solid spiral member. An apparatus for producing such a spiral pipe with a rib includes a rotational body disposed on a frame through a bearing in the outer periphery of the extreme end of an extrusion die provided by inner and outer tubular extrusion die members integrally formed so as to extrude a thermoplastic synthetic resin through a nozzle orifice into a tubular form, and a rotational body provided with a cylindrical die having a nozzle orifice for extruding a rib member having a hollow section, the cylindrical die being positioned at the extreme end of the rotational body, the outer peripheral surface of the extruded molded tubular body being opposed to the nozzle orifice of the cylindrical die immediately after being extruded by the extrusion die.

3 Claims, 2 Drawing Sheets

APPARATUS FOR PRODUCING SPIRAL PIPES WITH RIB

BACKGROUND OF THE INVENTION

1. Field of the Invention

The present invention relates to a method for producing continuously drain pipes, flexible drain pipes, suction hoses and the like made of synthetic resins and apparatus therefor.

2. Description of the Prior Art

Methods for producing flexible pipes (spiral pipes) with a rib are disclosed in Japanese Patent Publication Nos. 17987/1976 and 17988/1976. These patents disclose a method which comprises spirally shearing a hard resin pipe extruded into a pipe shape as desired by a rotating cutter, and integrally forming a spiral rib on the outer peripheral surface of a tubular member.

Alternatively, Japanese Patent Publication No. 53179/1982 provides a method comprising feeding a tape with a rib, while extruding the same, to an outside of an inclined winding shaft arranged at right angles to the extruding direction, rotating the winding shaft, and winding and fusing said tape with a rib to produce a spiral pipe.

The former method, i.e., the method for shearing a part of a pipe extruded by rotation of a cutter has disadvantages that a spiral rib is solid and is square in sectional shape, and as a result, a sectional shape of the rib cannot be suitably selected, and the sheared section is square-like and in addition, a large diameter pipe is heavy.

The latter method, i.e., the method for winding a tape with a rib which comprises winding a rib material extruded toward the outer peripheral surface of a rotating winding shaft as the latter rotates to produce a pipe, and therefore, this method has advantages that pipes can be produced without requiring excessive efforts and accurately whereas the aforesaid method has disadvantages that the apparatus becomes large-sized, has a problem in that a part of a tape is superposed and wound to have a tubular shape, which is liable to peel, and involves a problem in that since the product is rotating, apparatuses for winding, cutting and the like carried out in the succeeding steps become inevitably complicated and large-sized, thus increasing cost.

SUMMARY OF THE INVENTION

In view of the aforementioned disadvantages, it is an object of the present invention to simplify the producing apparatus and method to produce hollow or solid spiral pipes with ribs.

A thermoplastic synthetic resin material is continuously extruded in a molten state into a tubular form so as to have a diameter and a predetermined wall thickness of a tubular body to be formed, and a rib-portion material in a molten state having a hollow shape or a solid shape in section extruded by an extrusion nozzle rotated about the outer periphery of the extruded and molded tubular body relative to the extrusion speed for the extruded and molded tubular body is wound to integrally form a hollow or solid spiral member. In the producing apparatus, a rotational body is disposed through a bearing in the outer periphery of the extreme end of an extrusion die provided with a nozzle orifice having inner and outer tubes integrally formed so as to extrude a thermoplastic synthetic resin into a tubular form, and a cylindrical rotational die provided with a nozzle orifice for extruding a rib member having a hollow section or a predetermined section, the outer peripheral surface of the extruded molded tubular body immediately after being extruded by the extrusion base being opposed to the nozzle orifice of the cylindrical rotational die.

It is noted that the molding material for the tubular body and the molding material for the rib portion can be suitably selected and combined according to spiral pipes to be molded.

DETAILED DESCRIPTION OF THE PREFERRED EMBODIMENTS

Figure 1:
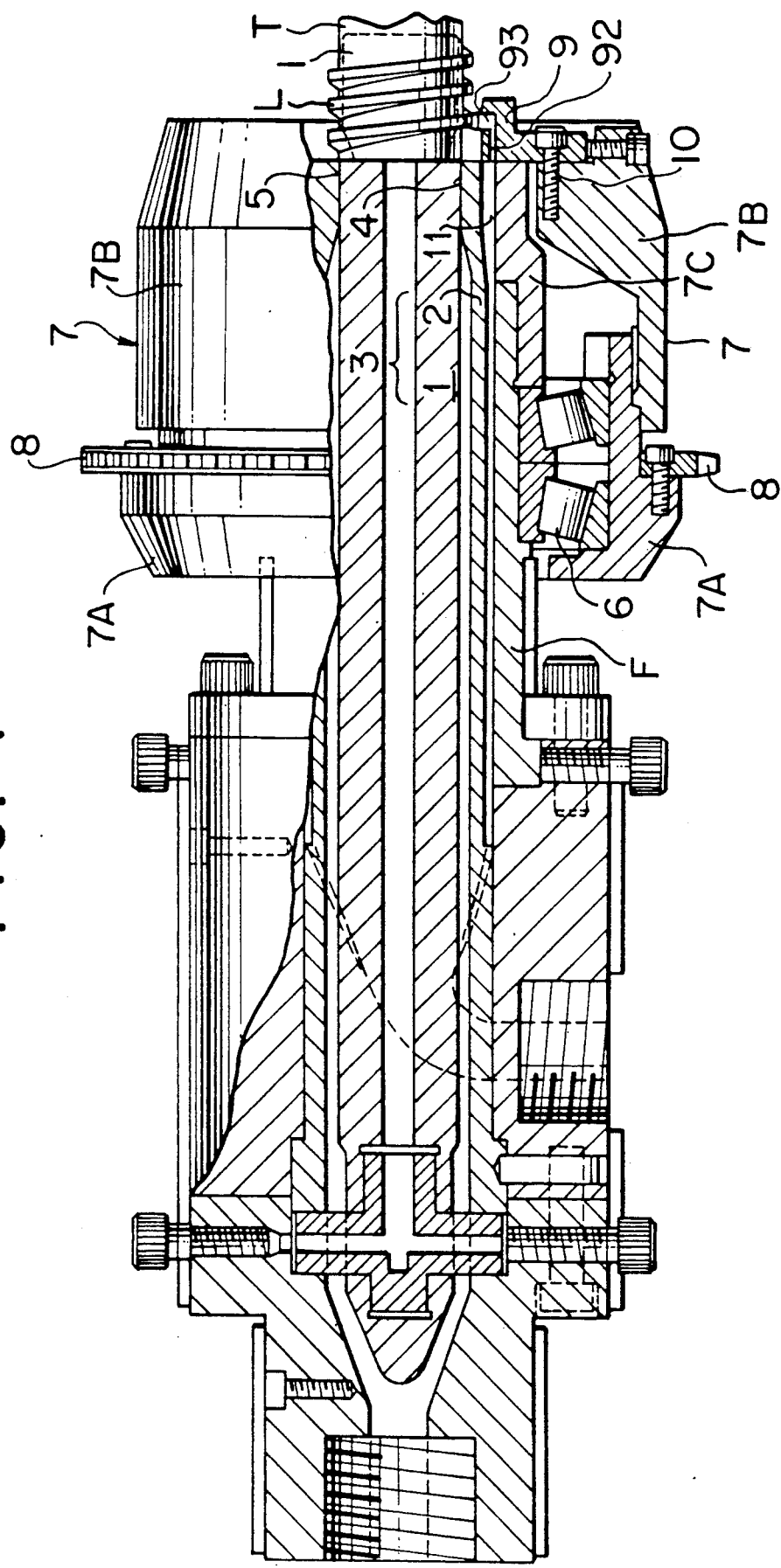
FIG. 1 is a sectional view showing one embodiment of apparatus according to the present invention.

The present invention will be described hereinafter by way of embodiments shown in the drawings.

In the drawings, an extrusion die 3 is formed by an inner tube and an outer tube 2, which provide a tubular material delivery passage 4 therebetween. Material is fed from the rear end of the extrusion die 3 or a suitable position, and a tubular nozzle orifice 5 for extruding the fed material is formed in the front end thereof. An aperture of the nozzle orifice 5 is predetermined so as to be a diameter or an outside diameter of a tubular body to be produced. A thermoplastic synthetic resin material in a molten state flows through the passage 4 and is extruded from the nozzle orifice 5. In this case, the extrusion speed of material can be variably adjusted. A rotational body 7 is rotatably provided in the outer periphery of a frame F of the extrusion die 3 through a bearing 6, and a sprocket wheel 8 or a gear is secured to the rotational body 7A so that the rotational body 7 is driven by an external power variably adjustably relative to the extrusion speed at which material is extruded from the nozzle orifice of the extrusion base.

The rotational body 7 is composed of a rear rotational body 7A supported on the frame F at the bearing 6 and a front rotational body 7B threadedly mounted thereon. The sprocket wheel 8 is secured to the rear rotational body 7A, and a cylindrical rotational die 9 which is different in diameter from and concentric with the extrusion die is secured to the extreme end of the rotational body 7B by means of a bolt 10.

Inside of the rotational body 7, a support tube 7C is interposed between the rotational body 7 and the outer tube 2, the support tube 7C being secured to the frame F. A tubular material delivery passage 11 is formed between the inner peripheral surface of the non-rotating support tube 7C and the outer peripheral surface of the outer tube 2, and a spiral hollow rib L is formed in the outer periphery of a flexible tube T by the material extruded from the passage 11.

Figure 2:
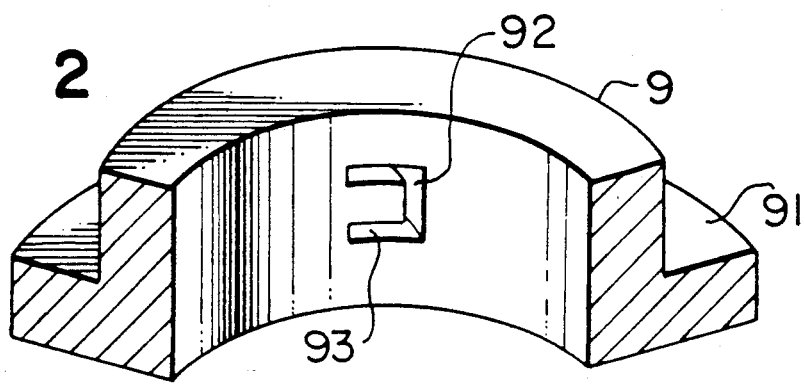
FIG. 2 is an external view having a rotational die sectioned.
Figure 3A:
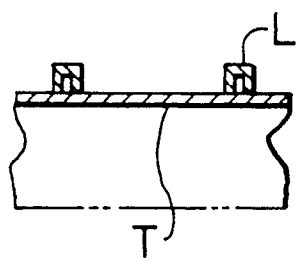
FIGS. 3 (A), (B), (C) and (D) are respectively sectional views of spiral pipes with hollow ribs produced by the method of the present invention.
Figure 3B:
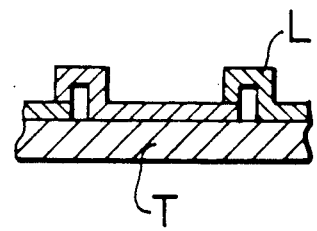
Figure 3C:
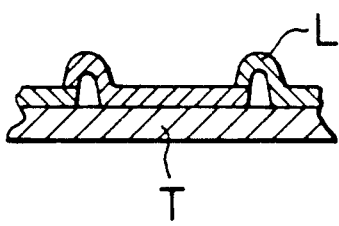
Figure 3D:
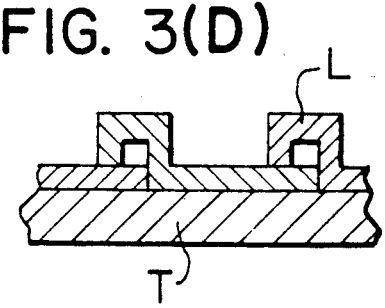

The rotational die 9 has a cylindrical shape in which a mounting collar 91 is projected from the outer peripheral surface of one end thereof so that it may be mounted by a bolt to the rotational body 7 as shown in detail in FIG. 2. An open passage 92 is bored on the side having the mounting collar 91, the opening being opposed to the passage 11 when the rotational die is mounted. Material extruded from the passage 11 is guided into the rotational die via the opening. The passage 92 in the die is a nozzle orifice 93 having a predetermined shape which is open to the inner peripheral surface of the rotational die 9. The shape of the nozzle orifice 93 may be suitably determined according to semi-circular shape, crank shape, spoon shape, in addition to ]-letter shape as shown and other outer shapes of hollow ribs to be formed. The material extruded from the nozzle orifice 93 is opposed to the outer peripheral surface of the tubular body extruded from the nozzle orifice 5 of the extrusion die 3, and when a hollow rib-like body of a tubular body T which is still in a molten state becomes fused and integrated, the open side of the hollow rib-like body come into contact with the outer peripheral surface of the tubular body.

By varying the shape of the nozzle orifice 93, the sectional shape of a flexible pipe with a hollow rib to be produced by the present invention is varied as shown in FIG. 3. This may be used properly according to the uses, and the width, height and contour of a rib are determined according to the size of the nozzle orifice 93.

Figure 4:
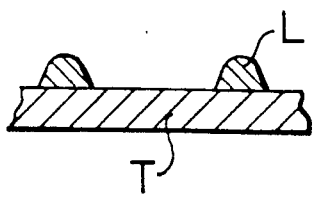
FIG. 4 is a sectional view of a spiral pipe with a solid rib.

The shape of the nozzle orifice 93 is made to have a predetermined sectional shape whereby a rib member extruded from the nozzle orifice 93 assumes a solid state. The product will be a spiral pipe with a solid rib as shown in FIG. 4.

The production of a spiral pipe with a hollow rib will be described hereinafter by use of the apparatus constructed as described above. A thermoplastic synthetic resin material which has been molten or to be molten halfway is supplied from a material supply device not shown by a first extruding machine into the passage of the extrusion base 3. Then, the material is extruded by the nozzle orifice 5 at the extreme end of the passage at a predetermined extrusion speed according to the quantity of supply, pressure and the like. At the same time, when a material to be a hollow rib is supplied to the passage 11 by a second extruding machine, the material passes the passage 11 through the rotational die 9 and is extruded by the nozzle orifice 93 in its predetermined sectional shape while turning about the outer periphery of the tubular body. The hollow rib material extruded from the nozzle orifice 93 as well as the tubular body T extruded straight without turning in the tubular form are in the molten state, and therefore they becomes fused and integrated at a position moved out of the nozzle orifice. At this time, a pitch of the hollow rib is determined according to the relative relation between the extrusion speed of the tubular body T and the rotational speed of the rotational die, and the hollow rib L is continuously wound about the outer periphery of the tubular body to produce a spiral pipe. In this case, pipes according to uses can be produced according to kinds of materials to be extruded from the respective passages. For example, when material supplied from the passages 4 and 11 by the first and second extruding machines are hard synthetic resin, they can be drain pipes in place of hard pipes and Hume pipes having no flexibility. Soft synthetic resin and hard synthetic resin are extruded from the passage 4 by the first extruding machine and from the passage 11 by the second extruding machine, respectively, whereby pipes, suction hoses and the like having flexibility can be produced. Further, the diameter of the tubular body to be formed is determined according to the rotational die and the diameter of the extrusion die.

According to the present invention, a rib member extruded in a molten state into a hollow rib or a solid rib while being rotated is wound around and becomes integrally fused with the outer periphery of a tubular body extruded straight without turning in a molten state so as to have a predetermined diameter of a pipe. Therefore, the tubular body is not turned as compared with the conventional producing method in which the winding shaft is turned to wind a rib about the outer periphery thereof. Thus, the winding device and cutting device in the succeeding steps can be simplified in construction. Products of uniform quality without twist can be obtained. Spiral pipes with hollow ribs or solid ribs can be continuously and simply produced.

Moreover, since a rotational die which is rotatable and in which a hollow rib or a solid rib is wound about the outer periphery of the tubular body and integrally and spirally formed is disposed in the outer periphery of the extrusion die for extruding and molding the tubular body, it is possible to easily produce a spiral pipe with a hollow rib or a solid rib which is simple in construction and has a predetermined pitch.

What is claimed is:

1. An apparatus for producing a plastic tube having an external helical rib which comprises:
    an extrusion die formed of an inner tubular die member and an outer tubular die member which define a first tubular flow channel therebetween for thermoplastic resin material and an extrusion nozzle for forming a plastic tube,
    a tubular frame positioned around said outer tubular die member to define a second tubular flow channel for thermoplastic resin material between said tubular frame and said outer tubular die member which is coaxial with said first tubular flow channel,
    a rotational body positioned around said tubular frame,
    bearing means located between said rotational body and said tubular frame to enable said rotational body to rotate around said tubular frame, and
    a tubular die element connected to said rotational body to extrude thermoplastic resin material from said second tubular flow channel onto an outer surface of a plastic tube extruded from said extrusion nozzle and provide a helical rib thereon with rotation of said rotational body.

2. An apparatus according to claim 1, wherein said tubular die element includes a nozzle orifice shaped to provide a hollow rib on said outer surface of said plastic tube.

3. An apparatus according to claim 1, wherein said inner tubular die member of said extrusion die includes an extended portion which extends beyond said outer tubular die member at said extrusion nozzle and said tubular die element extrudes thermoplastic resin material onto an outer surface of said plastic tube while passing over said extended portion.

* * * * *